United States Patent

[11] 3,595,329

| [72] | Inventors | Ronald Withnell<br>Wading River, N.Y.;<br>Leon Lachman, Millburn, N.J. |
|---|---|---|
| [21] | Appl. No. | 766,018 |
| [22] | Filed | Sept. 30, 1968 |
| [45] | Patented | July 27, 1971 |
| [73] | Assignee | CIBA Corporation, New York, N.Y. |

[54] WEIGHING APPARATUS WITH OSCILLATION-COMPARISON ELECTRICAL TRANSDUCER
4 Claims, 9 Drawing Figs.

| [52] | U.S. Cl. | 177/210, 177/1, 73/67.2 |
| [51] | Int. Cl. | G01g 3/16, G01g 7/00 |
| [50] | Field of Search | 177/1, 210; 73/67, 67.2 |

[56] References Cited
UNITED STATES PATENTS

| 1,431,638 | 10/1922 | Dowling | 177/210 |
| 2,322,681 | 6/1943 | Zenor | 177/210 UX |
| 2,694,310 | 11/1954 | Pounds | 177/210 X |
| 3,000,101 | 9/1961 | Giardino et al. | 177/210 X |
| 3,314,493 | 4/1967 | Kennedy | 177/210 |
| 3,366,191 | 1/1968 | Reid et al. | 177/210 |

FOREIGN PATENTS

| 685,598 | 5/1964 | Canada | 177/210 |
| 1,003,062 | 11/1951 | France | 177/210 |
| 622,581 | 12/1935 | Germany | 177/210 |
| 488,921 | 7/1938 | Great Britain | 177/210 |
| 736,006 | 8/1955 | Great Britain | 177/210 |
| 919,771 | 2/1963 | Great Britain | 177/210 |

*Primary Examiner*—Robert S. Ward, Jr.
*Attorneys*—Harry Goldsmith, Joseph G. Kolodny, Bryant W. Brennan and Edward J. Sites ABSTRACT: An arrangement for determining the weight of an object relative to a predetermined reference weight. A compliant system is vibrated along a predetermined axis substantially at the mechanical resonance frequency, said system having means for supporting the object. The system oscillation amplitude is proportional to the inertia of the system and is independent of gravity. The oscillation amplitude of the system is converted into an electrical signal which is compared with a reference signal representative of the reference weight and an error signal is utilized to provide a measurement and/or control function in correspondence with the difference between the weight of the object and the reference weight.

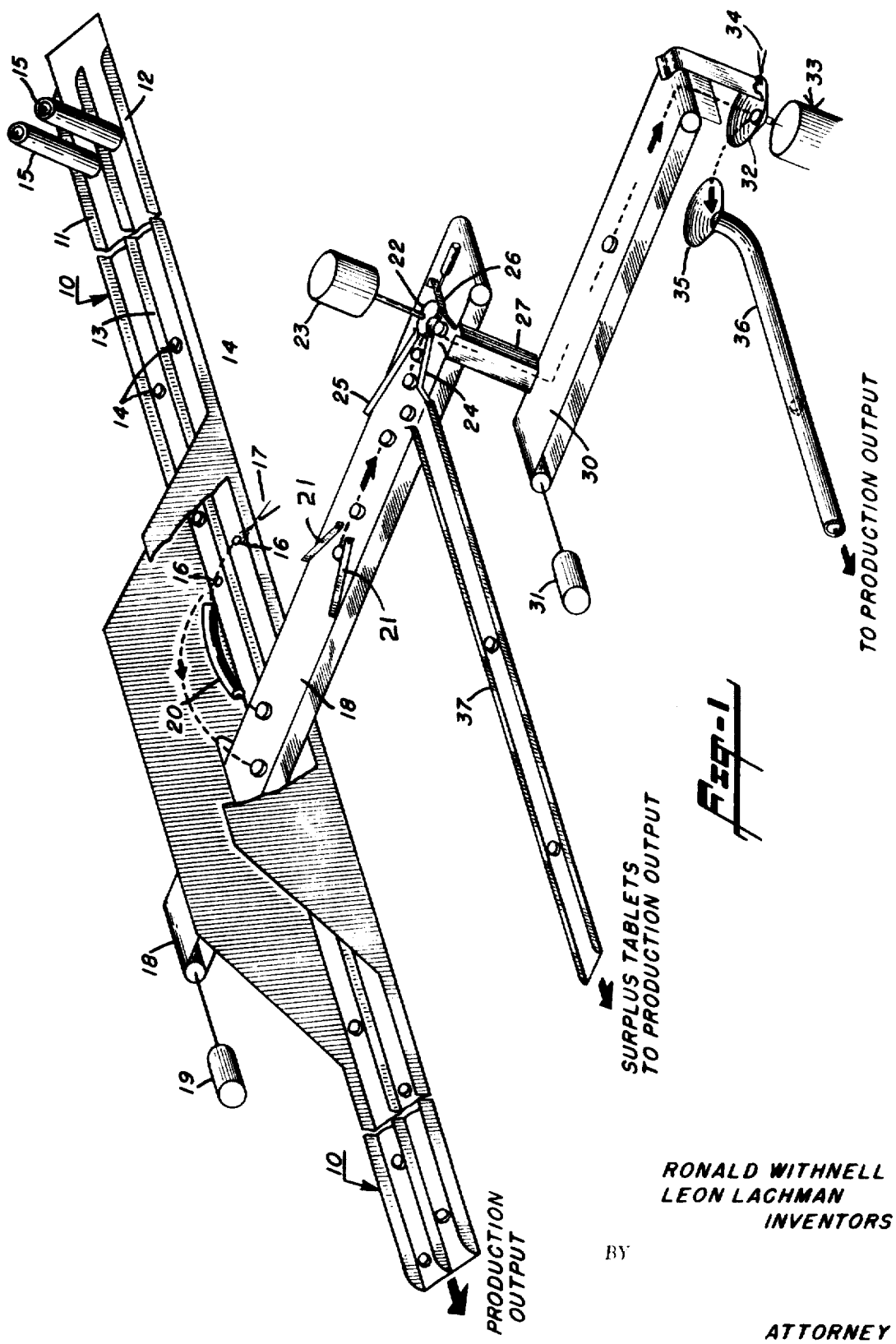

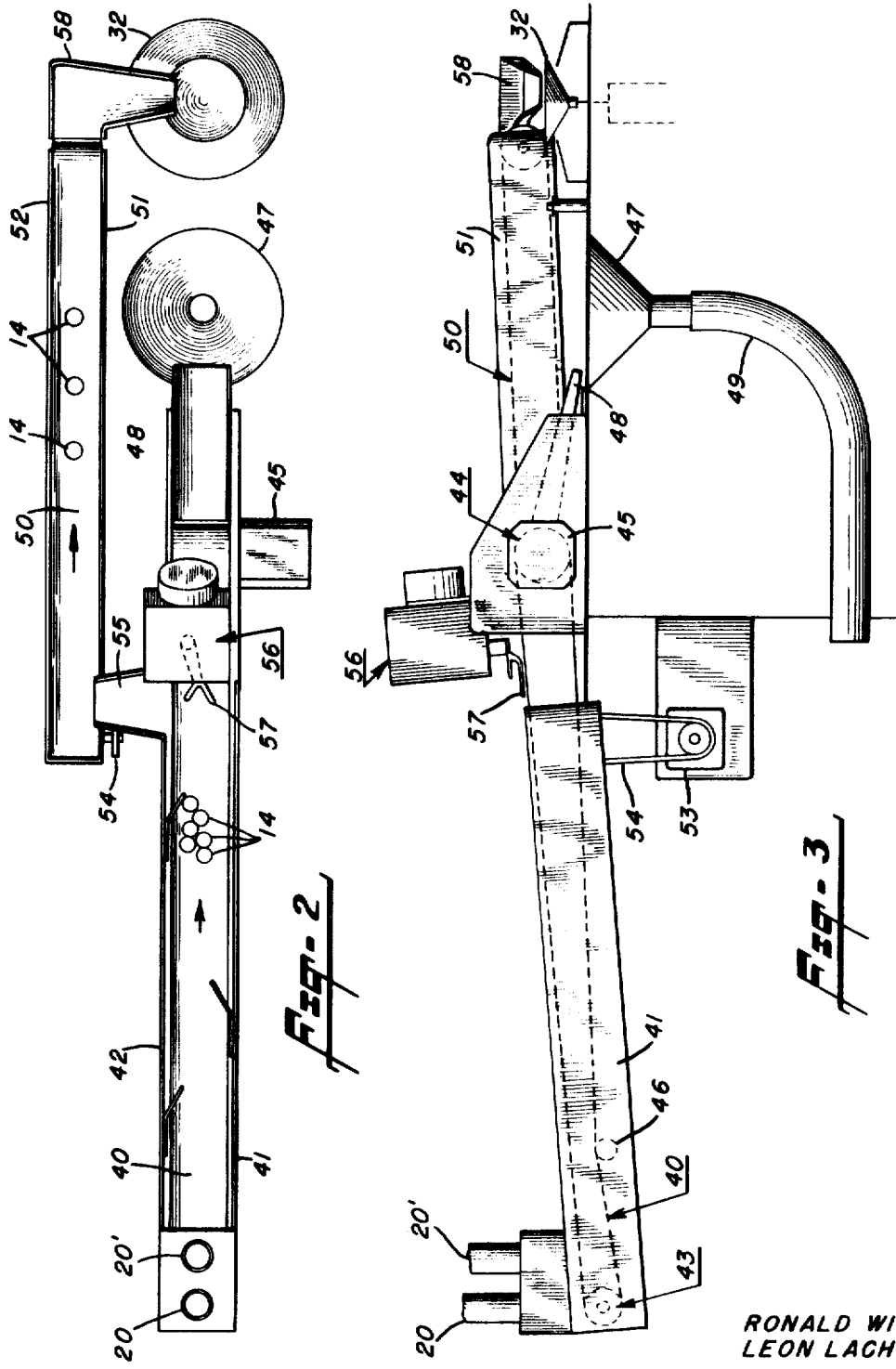

RONALD WITHNELL
LEON LACHMAN
INVENTORS

BY

ATTORNEY

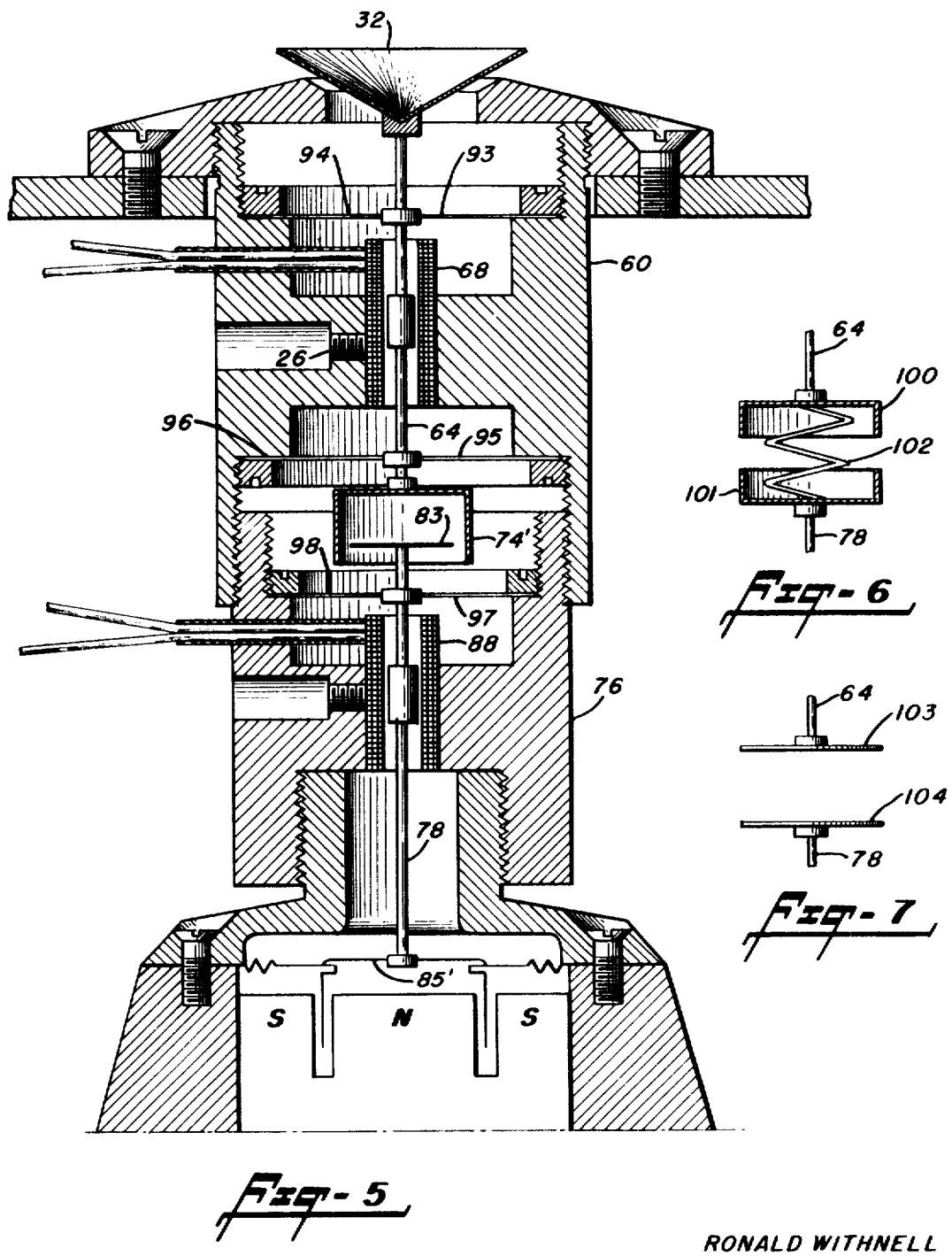

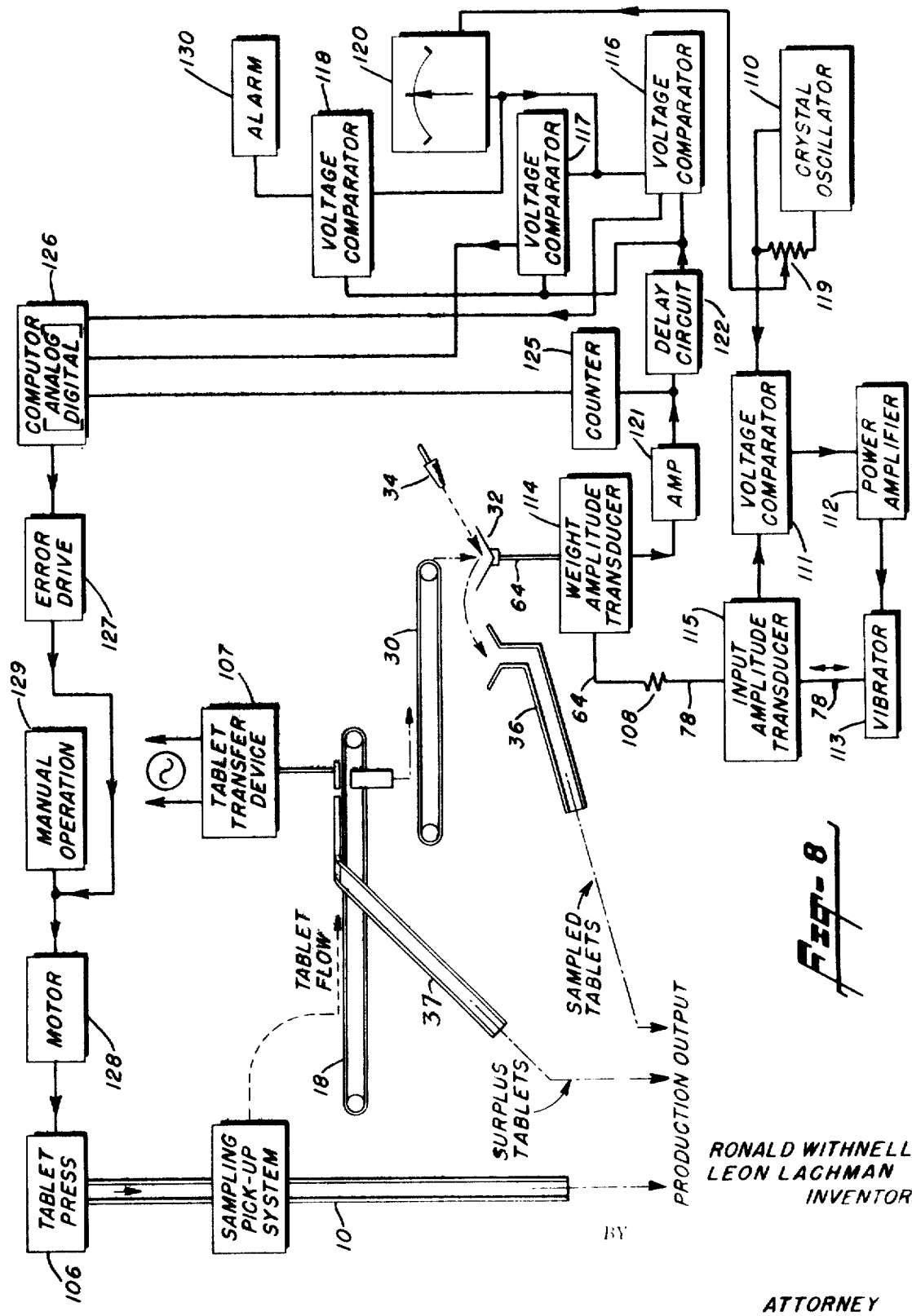

RONALD WITHNELL
LEON LACHMAN
INVENTORS

BY

ATTORNEY

WEIGHING APPARATUS WITH OSCILLATION-COMPARISON ELECTRICAL TRANSDUCER

BACKGROUND OF THE INVENTION

Various systems have heretofore been proposed for the automatic check-weighing of objects relative to a predetermined normal weight. In general, the speed and sensitivity of the prior systems are limited. Also, certain of the prior systems are affected by gravity and, therefore, may require compensating arrangements which increase the complexity and cost of the system and, generally, restrict the system for operation in a given plane.

A weighing system made in accordance with this invention functions to provide an accurate and rapid check-weighing of an object with reference to a predetermined reference weight, said system being independent of gravity and, therefore, operable in any plane. Furthermore, the operating range of the system is conveniently and quickly adjustable, thereby to condition the system for check-weighing of particular objects having widely different nominal weights.

Although a weighing system made in accordance with this invention is of general utility, it is particularly adapted for the accurate and rapid check-weighing of sample tablets, or the like, selected from a production line.

SUMMARY OF THE INVENTION

A weighing head comprises a compliant system having a weighing pan and coupled to an electrically driven vibrator. The system is constructed and arranged to have a simple harmonic motion near its mechanical resonance frequency. A timed selecting mechanism transfers a succession of sample tablets from a production line into the weighing pan at a predetermined rate and a transducer provides an electrical signal which varies with the oscillation amplitude of the system, which signal is compared with a reference signal corresponding to a predetermined correct tablet weight. During each weighing cycle, a deviation of the weighed tablet from the correct weight results in an error signal and, upon the completion of a predetermined number of weighing cycles, the error signals are averaged to effect a suitable adjustment in the operation of the tablet press supplying the production line. Each weighing cycle is completed within a time period less than the rate at which sample tablets are deposited in the weighing pan, and means are provided for the automatic return of the weighed tablet to the production line.

An object of this invention is the provision of an improved system for automatically determining the weight deviation of an object from a predetermined reference weight, which system is not affected by gravity.

An object of this invention is the provision of a check-weighing arrangement wherein an object to be check-weighed is carried by a compliant supporting system oscillated along a predetermined axis and wherein the amplitude of the system oscillations is converted into an electrical signal which is compared with a reference signal corresponding to a predetermined normal weight of the object.

An object of this invention is the provision of weighing apparatus having a compliant supporting system provided with means for carrying an object to be weighed, means vibrating the system along a predetermined axis at substantially its mechanical resonance frequency, and means for determining the difference between the oscillation amplitude of the system and the amplitude of reference oscillations representative of a predetermined object weight.

An object of this invention is the provision of an improved system for automatically check-weighing sample tablets or the like periodically selected from a production line.

An object of this invention is the provision of an automatic system for check-weighing tablets, which system comprises a conveyor receiving tablets from a tablet press, means periodically transferring sample tablets from the conveyor into a pan vibrated at substantially resonance frequency, transducer means responsive to vibrations of the pan and providing an electrical output which varies in correspondence with the weight in the pan, and control means responsive to a deviation of the transducer output from a predetermined reference value, corresponding to a correct weight for the tablet, said control means effecting a necessary correction in the operation of the tablet press.

An object of this invention is the provision of an improved weighing head particularly adapted for accurate check-weighing of small tablets and the like.

An object of this invention is the provision of a weighing head for use in providing a measurement and/or a control function in response to a weight deviation of an object from a predetermined correct weight, which head has an object-receiving member carried by a compliant support vibratable along a predetermined axis, a vibrator coupled to the object-receiving member thereby to induce oscillation of said member at a predetermined frequency and amplitude, and means providing an electrical output which varies in correspondence with the oscillation amplitude of said member.

An object of this invention is the provision of an arrangement for random selection of sample tablets or the like from a production line chute and discharging such tablets at a predetermined rate, said arrangement comprising means directing an air stream through an opening formed in the bottom of the chute, a first endless belt receiving tablets blown from the chute by the air stream, a second endless belt driven at a constant speed, and automatic means transferring tablets from the first belt into the second belt at constant time intervals.

The above-stated and other objects and advantages of the invention will become apparent from the following description when taken in conjunction with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 1 is a diagrammatic representation showing a system for transporting tablets from a production line to a weighing head in accordance with one embodiment of this invention;

FIG. 2 is a top plan view showing a tablet transport system made in accordance with another embodiment of the invention;

FIG. 3 is a corresponding side elevational view thereof;

FIG. 5 is a similar view showing a modified construction of the weighing head;

FIG. 6 is a fragmentary cross-sectional view showing another means for loosely coupling together the two active components of the weighing head;

FIG. 7 is a similar view showing still another form of coupling means;

FIG. 8 is a diagrammatic representation of the tablet transport and selecting mechanism shown in FIG. 1 together with a block diagram of the associated electrical components.

Figure 4:
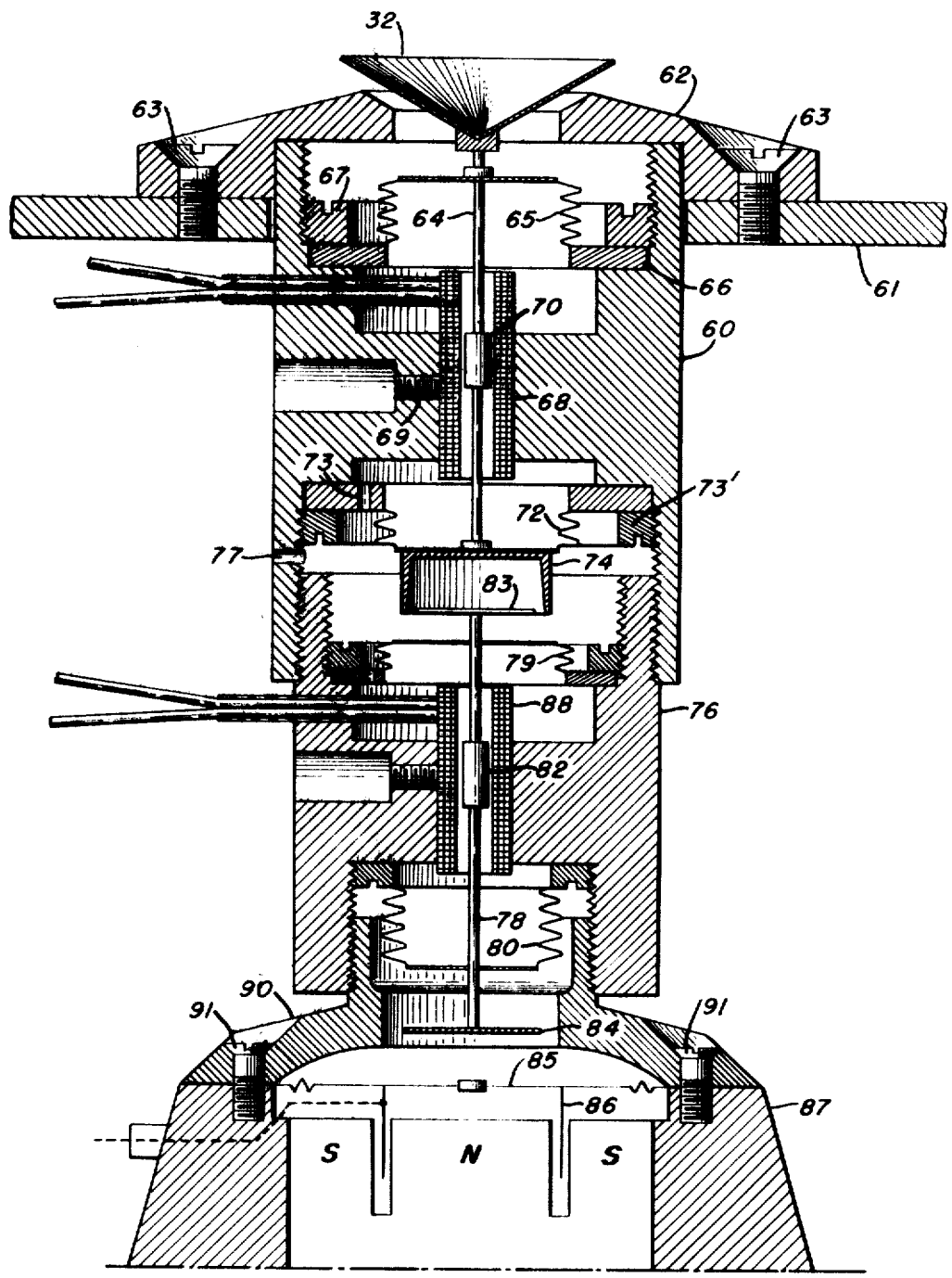
FIG. 4 is a central cross-sectional view of the tablet weighing head made in accordance with one embodiment of this invention.

Reference now is made to FIG. 1 wherein there is shown a primary conveyor comprising an inclined, vibratable chute 10 having upstanding sidewalls 11, 12 and a center partition 13, said sidewalls including intermediate portions of increased height. Tablets 14 are discharged unto the two sections of the conveyor as, for example, through the delivery tubes 15, which tubes receive tablets from a tablet press. A pair of air nozzles, disposed beneath the chute, are aligned with a pair of apertures 16 formed in the chute bottom, one such nozzle 17 being shown in the drawing. Passing through aligned openings formed in the chute sidewalls is an endless belt 18, said belt overlying the bottom of the chute and being driven by an electric motor 19. In the diagrammatic representation, a single row of spaced tablets is shown in each of the chutes. However, in actual practice, the width of each chute is much wider and the bottom of each chute is filled with tablets, in fact, some tablets overlie others during their transport along the chute. A continuous air stream, directed upwardly through the apertures 16, periodically strikes particular tablets in such manner as to blow such tablets upwardly from the chutes, thereby resulting in a random selection of tablets. Arcuate tubes made of a suitable plastic, such as the fragmentary tube identified by the numeral 20, direct the selected tablets onto the belt 18, each such tube having an end aligned with an aperture 16 and spaced slightly above the tablets flowing along the chute. The remaining tablets are discharged by the chutes to a production output as, for example, to a tablet counting and bottle-filling machine.

Overlying the belt 18 is a first set of converging guides 21 which serve to center the tablets as they are transported toward a tablet-transfer mechanism comprising a disc 22 attached to the shaft of a motor 23, said disc having a concave, semicircular notch formed in the peripheral surface thereof. This notch has a radius somewhat larger than that of the particular tablets. A second set of converging guides 24 and 25 have ends presented to the periphery of the disc, which ends are spaced apart by a distance slightly greater than the tablet diameter. An adjustable stop member 26 is in sliding engagement with the peripheral surface of the disc and includes an offset end portion which extends beyond the edge of the belt and over a vertical tube 27. It is here pointed out that tablets transported by the belt will accumulate between the guides 24 and 25 and, under the forward pressure applied to these tablets by the moving belt, the lead tablet is pressed against the disc. Upon rotation of the disc, the lead tablet will be pressed into the disc notch and rotated into engagement with the offset portion of stop member 26, whereupon the tablet is directed into the tube 27.

Each revolution of the disc 22 results in the deposit of a tablet onto a second endless belt 30 driven at a constant speed by a motor 31. The spacing between the tablets carried by this belt is determined by the speed of the belt-drive motor 31 and the frequency of rotation of the disc. Consequently, sample tablets are deposited, at a predetermined rate, into the conical pan 32 of a weighing head here generally identified by the numeral 33. As will be described in detail hereinbelow, at the conclusion of the weighing cycle, air under pressure is released through the nozzle 34 thereby to blow the weighed tablet into the funnel 35, carried by a return tube 36, which directs such tablet to the production output supplied by the vibratable chute 10. Surplus tablets carried by the belt 18 also are returned to the production output by means of the chute 37.

A modification of the tablet selecting system is shown in the top plan and side elevational views of FIG. 2 and 3, respectively. In this system, sample tablets blown from the production line chute are directed onto an inclined, endless belt 40 through the delivery tubes 20 and 20', said belt being disposed between spaced guide rails 41 and 42 and carried by the end rollers 43, 44, the latter being driven by a motor 45. An adjustable guide roller 46 serves to maintain the necessary tension between the belt and the pulleys. Normally, tablets deposited on the belt 40 are transported over the end pulley 44 and are directed into a funnel 47 by the inclined chute 48, which funnel is connected to a tube 49 for gravity feeding of the surplus tablets to the production output.

Spaced to one side of the belt 40 is a second endless belt 50 disposed between spaced guide rails 51, 52 and driven at a constant speed by a motor 53, which motor is secured to a suitable supporting framework and is coupled to an end pulley of the belt 50 by means of a drive belt 54. A laterally extending, downwardly inclined transfer chute 55 (FIG. 2), has its upper end positioned somewhat below the upper surface of the belt 40 and its lower end extending over and spaced from the belt 50. Periodically, sample tablets are swept off the belt 40 by a transfer mechanism generally identified by the numeral 56, the rear guide rail 42 being provided with an opening for this purpose. The transfer mechanism includes a pivot arm 57 secured to a rotatable rod and having a bifurcated end presented to the tablets 14 carried by the belt 40. This pivot arm is spaced above the belt by a distance which is less than the tablet thickness. Upon continuous flow of the tablets past the pivot arm, one tablet will be pressed into the picket formed by the bifurcated end of the said arm. Periodically this arm is rotated, thereby to move such tablet into the transfer chute 55, after which the arm returns to the illustrated, normal position. Thus, sample tablets are deposited, in succession, onto the belt 50, the spacing between such tablets being determined by the speed of the belt and the operating frequency of the pivot arm. Tablets carried by the belt 50 are transported to a chute 58 and deposited into the conical pan 32 of the weighing head, which head will now be described.

Reference now is made to FIG. 4 which is a central, cross-sectional view of a weighing head constructed and arranged in accordance with one embodiment of this invention. An upper, cylindrical housing member 60, made of metal, passes through a clearance hole, formed in a mounting plate 61, and is threaded to a cap member 62 which is secured to the mounting plate by screws 63. Formed in the cap member is a central hole terminating in a conical bore. The conical weighing pan 32 is secured to a central shaft 54 which oscillates in a vertical plane when the weighing head is in operation, as will be described hereinbelow. Desirably, the spacing between the pan and the cap member is slightly greater than the maximum displacement of the pan, thereby to minimize the entrance of dust, or other deleterious matter, into the mechanism. The shaft 64 is secured to a disc closing one end of the bellows 65, the other end of the bellows being secured to a mounting flange 66. The housing members 60 is provided with an internal thread and shoulder, whereby the bellows is secured in place by a threaded retaining ring 67. An upper transducer comprises a plurality of coils, here designated by the numeral 68 and secured in place by a set screw 69, and a soft-iron armature 70 which is secured to the shaft 64. The lower end of this shaft is secured to the closure disc of a second bellows 72 secured in place by a threaded retaining ring 73', the mounting flange of these bellows having a vent hole 73 formed therein. Secured to the closure disc of these bellows, is an inverted, cylindrical cup 74 having a tapered inner wall. It will be apparent that the two bellows 65 and 72 form a compliant support for the weighing pan 32, the shaft 64 and the cup 74.

A lower cylindrical housing member 76, made of metal, is threaded to the upper housing member 60, the upper end of the member 78 being spaced from the threaded retaining ring 73, thereby providing a clearance area for a vent hole 77 formed in the wall of the member 60. A lower shaft 78 is secured to the end closure discs of the bellows 79 and 80. This shaft, carrying a soft-iron armature 82, has flat discs 83 and 84 secured respectively to its upper and lower ends. THe disc 83 is movable within the cup 74 and the disc 84 is spaced from the diaphragm 85 of an electromechanical vibrator having a movable coil 86 displaceable in the flux gap of a permanent magnet 87. The soft-iron armature 82 and the coils 88, (secured in place by a set screw), form a second transducer. As shown, the vibrator is secured to a flangelike mounting member 90 by screws 91, which mounting member terminates in a nipple portion threaded to the member 76.

In operation, alternating current is passed through the coil 86 to cause the diaphragm 85 to vibrate at a predetermined frequency and amplitude. The disc 84 is disposed within a chamber which is sealed at the upper end by the bellows 80 and at the lower end by the diaphragm. Consequently, this disc, the lower shaft 78 and the armature 82 vibrate vertically in correspondence with the diaphragm. The lower shaft drives the upper shaft 64 through the coupling formed between the flat disc 83 and the surrounding cup 74. The vibrator is driven at a constant frequency which frequency is near the mechanical resonance frequency of the system supported by the upper bellows 65 and 72. Upon vibration of the two shafts, the two transducers produce output voltages which vary in magnitude with the relative displacements of the associated shafts. With a tablet of correct weight placed into the pan, the output of the upper transducer is compared to a standard potential, thereby to set a zero reference point for the system. Thereafter, when a sample tablet is deposited into the weighing pan, the vibration amplitude of the upper shaft will increase or decrease depending upon whether the weight of such tablet is below or above the correct weight, respectively. As will be described hereinbelow with reference to FIG. 8, during each weighing cycle, the output of the transducer is compared with the standard and a weight deviation of the weighed tablet, from the predetermined correct weight, results in an error signal. After a predetermined number of weighing cycles, the error signals are averaged and a control circuit effects a suitable adjustment in the operation of the tablet press.

The function of the bellows is to form a compliant support for the two shafts and to limit oscillations thereof along the axis of the two shafts, while the described vent holes provide for a transfer of air from the atmosphere to the otherwise closed chamber defined by the bellows 65 and 72. Temperature compensation of the weighing head is achieved by selection of the metals employed in its manufacture. By making the two cylindrical housing members 60 and 76 of brass, and using Beryllium copper alloy bellows, the apparatus is substantially self-compensating for normal ambient temperature changes. Furthermore, the individual bellows may be of different sizes, thereby to compensate for differences in the weight distribution of the movable members of the system. It is to be noted that the cylindrical members 60 and 76 are threaded to each other and, therefore, the axial spacing between these members may be varied, thereby to advance or retract the flat disc 83 relative to the surrounding cup 74. This provides a means for adjusting the initial coupling between the two shafts 64 and 78.

Reference now is made to FIG. 5 showing modifications in the construction and assembly of the weighing head. Here the two, uppermost bellows are replaced by two sets of leaf springs, specifically, the leaf springs 93 and 94 secured to the upper shaft 64 above the transducer coils 68, and the leaf springs 95 and 96 secured to the shaft below such coil. The flat disc 83, carried by the lower shaft 78, is movable within the cup 74' secured to the end of the upper shaft. The lower shaft 78 is secured directly to the diaphragm 85', thereby requiring only a single set of leaf springs 97 and 98 to complete the necessary suspension thereof. Inasmuch as all of the individual leaf springs are relatively narrow, the interior of the weighing head is open to the atmosphere at the weighing pan, thereby eliminating the need for separate vent holes in the structure.

In the embodiments shown in FIGS. 4 and 5, the lower and upper shafts are air-coupled by means of a flat disc displaceable within a surrounding cup. Other types of coupling may be utilized, as shown in the fragmentary views of FIGS. 6 and 7. In FIG. 6, the upper and lower shafts 64 and 78 have matching cylindrical cups 100 and 101 secured to their spaced, proximate ends. A spring 102, made of a nickel-iron alloy having a low thermal expansion, has its ends secured to the cylindrical cups. In FIG. 7, the two shafts 64 and 78 have secured thereto flat discs 103 and 104, said discs being made of a ceramic magnetic material.

Reference now is made to FIG. 8 which is a diagrammatic representation showing the essential components of a complete tablet transport, selecting and weighing system made in accordance with this invention. Tablets from the tablet press 106 are transported by the chute 10 to a discharge point identified by the legend Production Output. Representative tablets, selected at random from the production run by means of the above-described air stream arrangement, are transferred onto the endless belt 18 and a plurality of such selected tablets accumulate at the forward end portion thereof. The Tablet Transfer Device 107 operates periodically to transfer sample tablets from the belt 18 to the endless belt 30 which is driven at a predetermined, constant speed, surplus tablets being directed into the chute 37 for return to the production line. The sample tablets are deposited, in succession, into the weight pan 32 at a time spacing determined by the speed of the belt 30 and the operating frequency of the transfer device 107, which time spacing is somewhat longer than that of a weighing cycle. Upon conclusion of the weighing cycle, air is released through the nozzle 34, thereby to blow the weighed tablet out of the pan and into the chute 36 for return to the Production Output.

The pan 32 is carried by the upper shaft 64, of the weighing head, which shaft is coupled to the axially aligned, lower shaft 78 by a Resistive Coupling here identified by the numeral 108. A standard frequency generator, such as a Crystal Oscillator 110, supplies a voltage of predetermined frequency and magnitude to a Voltage Comparator 111, the output of the Comparator being amplified by the Amplifier 112 for driving the Vibrator 113. The vibratable element of the vibrator and the lower shaft 78 are either air-coupled as shown in FIG. 4, or directly connected as shown in FIG. 5. In either case, the lower shaft vibrates in correspondence with the vibrator at a given frequency and amplitude. The upper transducer 114 is coupled to the upper shaft 64 and the lower transducer 115 is coupled to the lower shaft 78, said transducers being here identified by the legends Weight Amplitude Transducer and Input Amplitude Transducer, respectively. Since the shaft 78 is tightly coupled to the vibrator 113, the voltage output of the lower transducer 115, which is applied to the comparator 111, has the same frequency as that of the oscillator 110. A difference in the magnitude of the two voltages applied to the comparator 111 results in corresponding change in the voltage applied to the vibrator, thereby to maintain a constant vibration amplitude of the lower shaft 78.

The output of the oscillator 110 also is applied to the Voltage Comparators 116, 117 and 118 through a potentiometer 119 and an indicating meter 120, the latter having a scale calibrated in values of tablet weights. By adjusting the potentiometer so that the pointer of the meter is aligned with a scale mark corresponding to the correct weight of the particular tablets being produced, the magnitude of the reference voltage applied to these comparators is representative of a correct tablet weight. The upper transducer 114 produces a voltage which varies in magnitude with the vibration amplitude of the shaft 64 carrying the pan, which voltage is amplified by the amplifier 121 and applied to these comparators through a delay circuit 122.

In operation, the inertia of a tablet striking the pan 32 results in a sudden, increased deflection of the shaft 64 resulting in a sharp voltage pulse, of higher than normal magnitude, applied to the amplifier 121. This amplified, momentary voltage pulse is applied to a Counter 125 which is programmed to activate an analog to digital Computer 126 when a predetermined number of tablets have been weighed. However, such voltage pulse is blocked from the comparators 116, 117, and 118 by the delay circuit 122 having a time-delay of one-half second, which is sufficient to allow the weight to settle in the pan. When the weight has settled, the output of the transducer 114 is applied to the three comparators. If the tablet is of correct weight, the outputs of these comparators will be zero. The comparators are preset to provide outputs corresponding to predetermined percentage differences between the two input voltages applied thereto. For example, if the comparator 116 is set for a plus 2 percent difference, it will apply a plus voltage to the computer when the weight of the tablet in the pan exceeds the correct weight by 2 percent. Similarly, the comparator 117 applies a negative voltage to the computer when the weight of the tablet is 2 percent less than the correct weight. These voltages are stored in the computer. The weighed tablet then is blown from the pan by an air stream discharged at a predetermined time through the nozzle 34 controlled by a suitable oneoff timing device. The tablet-weighing cycle has a time period which is somewhat less than that at which the tablets are deposited into the pan. Each tablet dropped into the pan results in the application of an amplified voltage pulse applied to the counter 126. The computer averages the positive and negative voltages applied thereto by the comparators 116 and 117 and after a predetermined number of tablets have been weighed, as determined by the number of pulses applied to the counter 125, the counter activates the computer whereupon an error voltage is applied to an Error Drive 127. This error voltage is of a polarity and magnitude depending upon the average of the voltages applied to the computer by comparators 116 and 117. The error drive 127, which may be an electrically driven rheostat, adjusts the voltage applied to the motor 128 of the tablet press, thereby to make the necessary correction in order to maintain the weight of the tablets within a predetermined weight range. A manual control, identified by the numeral 129, is provided to override the automatic, press-control system.

The comparator 118 is preset to provide a voltage output when the weight of a tablet in the pan varies more than a predetermined amount from the correct weight as, for example, ±10 percent. Such output voltage effects the actuation of a suitable alarm 130 and/or a suitable circuit breaker to deenergize the motor of the tablet press.

It is here pointed out that the individual electrical components of the weighing system, shown in block diagram form, are of conventional design and operation and a specific description of the circuitry thereof is not essential to an understanding of the invention by one skilled in this art.

Figure 9:
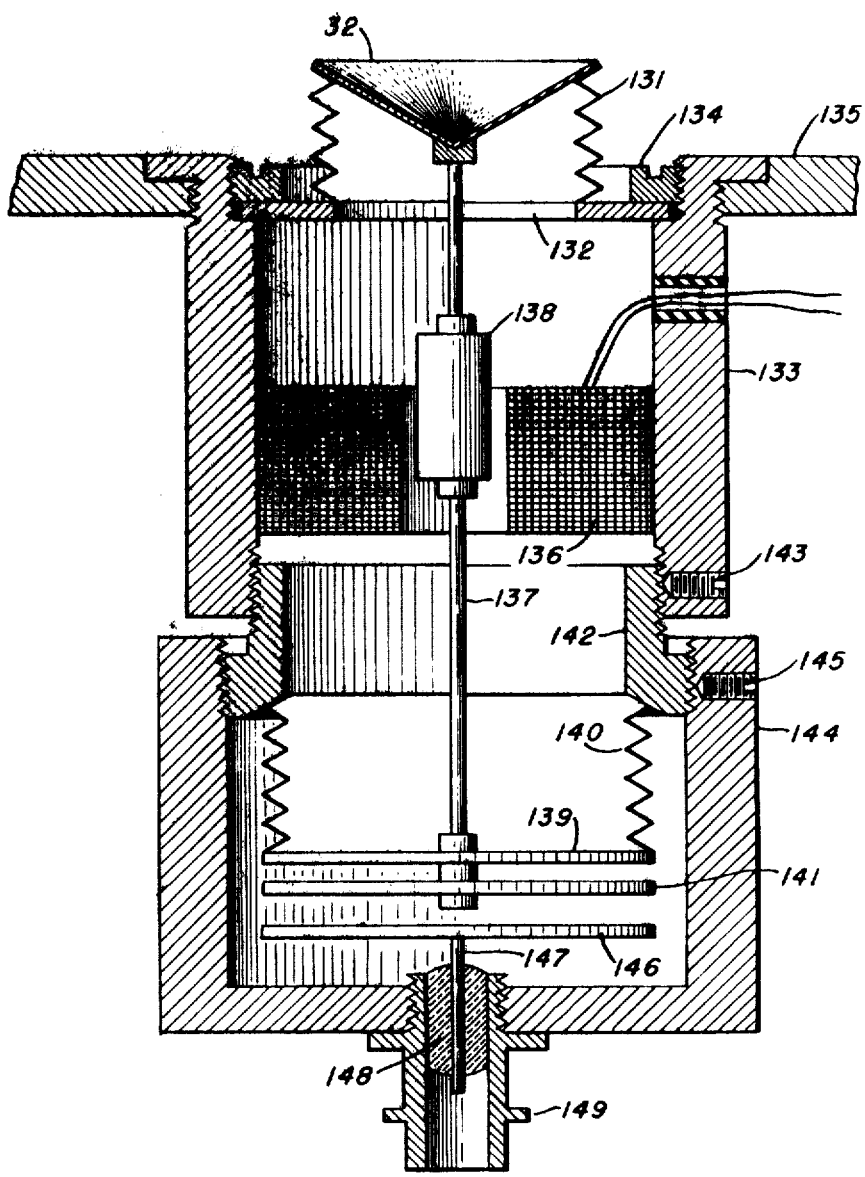
FIG. 9 is a central cross-sectional view showing another modification of the weighing head.

In the weighing heads shown in FIGS. 4 and 5, the weighing pan is carried by a compliant system oscillated substantially at its resonance frequency by a vibrator coupled thereto. Another modification of the weighing head is shown in FIG. 9 to which reference now is made. Here, one end of the upper bellows 131 is secured to the weighing pan 32 and the other end is secured to a mounting flange 132, which flange is secured to the cylindrical housing member 113 by means of the threaded retaining ring 134. The housing member 133 is provided with an outwardly extending flange and a threaded portion by means of which said member is secured to the mounting plate 135. Secured within this housing member is a solenoid coil 136 formed of wire having a zero temperature coefficient of resistance. A stainless steel shaft 137 carries an armature 138 made of a ceramic magnet material, said shaft having one end secured to the weighing pan and the other end extending through and secured to a circular disc 139 closing the bellows 140. Also secured to the shaft is a circular plate 141. The open end of the bellows 140 is secured to a coupling member 142 having an end threaded into the housing member 133, a set screw 143 retaining the two members in fixed position relative to each other. The coupling member 142 terminates in a threaded flange portion coupled to a cup-shaped housing member 144, a set screw 145 retaining these two members in fixed position relative to each other. A second circular plate 146 is spaced from the similar plate 141 and has secured thereto a pin 147 molded in an insulating bead 148 carried by a pin type connection socket 149.

The housing members 133 and 134 and the coupling member 142 are made of brass and the two bellows are made of a Beryllium copper alloy. The magnet 138, carried by the shaft 137, is displaced with respect to the median plane of the coil 136, whereby energization of the coil by an AC voltage, or a chopped DC voltage, results in an axial oscillation of the shaft 137. The frequency of the voltage applied to the coil is such that the system oscillates near its resonance frequency, good, stable power supplies being available to maintain the driving energy applied to the system at the precise, selected frequency and amplitude. The two circular plates 141 and 146 form a capacitor which is connected to a radio frequency oscillator through the connection socket 149, it being noted that the plate 141 is grounded to the socket through the bellows 140 and the housing member 144. The spacing between the two plates 141 and 146 varies in correspondence with the vibration amplitude of system carrying the weighing pan, thereby resulting in corresponding variations in the frequency of the radio frequency oscillator. With a tablet of correct weight placed in the pan, the radio frequency oscillator will oscillate at a frequency corresponding to the zero reference point of the system. Thereafter, deviations of sample tablets from the correct weight will result in corresponding changes in the frequency of the radio frequency oscillator, which changes are converted, by suitable circuitry, into corresponding error signals. These error signals are averaged over a predetermined number of weighing cycles to effect a change in the operation of the tablet press, as has already been described.

The several embodiments of the weighing head have been particularly described for use in check-weighing tablets, a specific application wherein it is convenient to have a weighing pan carried by a compliant supporting system oscillated in a vertical plane. It is here pointed out that the vibratory systems are constructed and arranged in such manner that they oscillate along a single axis, in a simple harmonic motion and at a frequency near the resonance frequency. The system oscillation amplitude is proportional to the inertia of the system and is independent of gravity. Consequently, the weighing heads will function as described even though they are disposed in a plane other than horizontal.

Having now described several embodiments of the invention those skilled in this art will be able to make various changes and modifications without thereby departing from the spirit and scope of the invention as recited in the following claims.

I claim:
1. Weighing apparatus comprising,
 a. a system carried by an elongated housing member and mounted for vibration along a predetermined axis, said system including means for supporting an object to be weighed and a first axial shaft disposed in said housing member,
 b. drive means for vibrating the system substantially at its resonance frequency, said drive means comprising an electromechanical vibrator carried by said housing member and having a vibratable element, a second shaft disposed in said housing member and axially spaced from said first shaft, means mounting said second shaft for vibration along said predetermined axis, and means coupling said second shaft to the said vibratable element and to the said first shaft, and
 c. transducer means providing an electrical output signal which varies in amplitude in correspondence with the vibration amplitude of the said system.

2. The invention as recited in claim 1, including means providing an electrical reference signal of predetermined constant amplitude, and means responsive to the difference in the amplitudes of said output and reference signals.

3. The invention as recited in claim 1, wherein the said transducer means comprises a first plate carried by the said system; a second plate carried by housing member, said second plate being parallel to and spaced from said first plate; and means for connecting the two plates into an electrical oscillator circuit.

4. The invention as recited in claim 1, wherein the said transducer means comprises an electrical coil carried by said housing member, and a magnetic material member carried by the said first shaft and magnetically coupled to said coil.